UNITED STATES PATENT OFFICE.

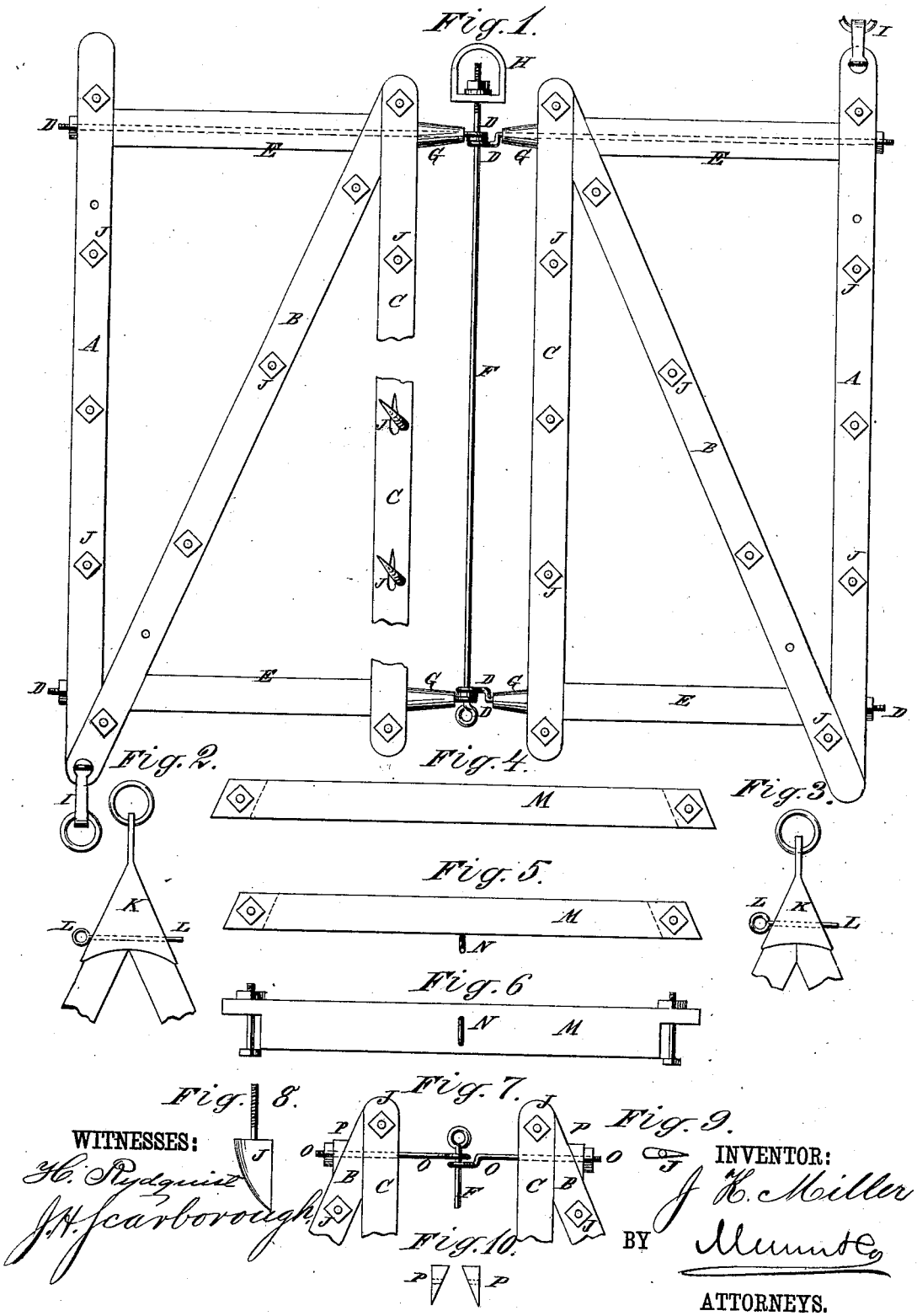

JOHN K. MILLER, OF PLEASANT HILL, MISSOURI.

IMPROVEMENT IN HARROWS.

Specification forming part of Letters Patent No. 201,435, dated March 19, 1878; application filed August 11, 1877.

*To all whom it may concern:*

Be it known that I, JOHN K. MILLER, of Pleasant Hill, in the county of Cass and State of Missouri, have invented a new and useful Improvement in Harrows, of which the following is a specification:

Figure 1 is a plan view of my improved harrow, part of one of the bars being broken away and inverted to show the grooves for the teeth. Figs. 2 and 3 show the forward ends of the two V-harrows. Figs. 4 and 5 are top views of the two cross-bars of the V-harrows. Fig. 6 is a rear view of one of the cross-bars. Fig. 7 shows the forward end of another form of harrow. Fig. 8 is a side view of one of the teeth. Fig. 9 is a top view of the same. Fig. 10 is a detail view of the beveled washers.

Similar letters of reference indicate corresponding parts.

The object of this invention is to furnish an improved harrow which shall be so constructed that it may be readily taken apart, and adjusted into different forms, as the work to be done or the crop to be cultivated may require, and which shall be simple in construction, strong, and durable.

The invention will first be described in connection with the drawing, and then pointed out in the claim.

The main harrow is formed in two parts, hinged to each other, and each part is formed of three bars, A B C, the bars A C being parallel, and connected at their alternate ends by the diagonal bar B. The ends of the outer bars A that come in contact with the bars B are beveled, and the ends of the bars B that come in contact with the bars C are beveled, as shown in Fig. 1.

The end parts of the bars A B C are connected by the bolts D, which pass through them, and through the blocks E, interposed between them. The bolts D have eyes formed upon their inner ends to receive the connecting-rod F. The eyes of the bolts D are kept at such a distance from the bars C as will keep the said bars at the proper distance apart by conical washers G, through which the said bolts D pass. The bolts D are secured in place by nuts screwed upon their outer ends.

The rod F hinges the two parts of the harrow together, and may also be used as a draw-rod by having a ring or loop, H, swiveled to one of its ends by a nut or key. The harrow may also be drawn by either corner, by having a clevis, I, attached to said corner.

J represents the teeth, which are made with one straight edge and one inclined or curved edge. The straight edges of the teeth J are rounded off or made semi-cylindrical in form. The curved or inclined edges of the teeth J are beveled from the center line of said teeth to the said edges. Upon the upper ends of the teeth J are formed stems or bolts, which pass up through holes in the bars A B C, and have nuts screwed upon their upper ends. Upon the under sides of the bars A B C are formed grooves to receive the shoulders of the teeth J, so that the said teeth may be adjusted according as the said bars A B C are adjusted.

The harrow may be adjusted for use as two V-harrows, by putting the beveled ends of the two bars A and of the two bars B together, placing the angular cap K upon said ends, and securing it by the bolt L. The caps K have rings, links, or eyes attached to or formed upon them for the attachment of the draft.

The middle parts of the bars A and B are kept in place by having the halved ends of the cross-bars M bolted to their middle parts. To the cross-bar M of one of the V-harrows is attached a hook, N, to receive the draw-eye link or ring of the other V-harrow, to form a double V-harrow.

For some uses the outer bars A may be detached, forming a VV-harrow. In this case one pair of the long bolts D is detached, and replaced by a shorter pair, O. The detached bars A may be formed into a V-harrow, and attached to the rear end of the rod F, as shown in Fig. 7.

In forming the V and VV harrows, beveled washers P are placed upon the outer ends of the bolts D O before the nuts are put on, so that the said nuts may have a square bearing, and may thus hold the harrow-frames more firmly.

Having thus described my invention, I claim as new and desire to secure by Letters Patent—

The harrow-frame formed of the bars A B C, the bolts D, the rod F, and the washers G, to adapt the said bars A B C to be arranged in different ways, substantially as herein shown and described.

JOHN KENNY MILLER.

Witnesses:
C. R. WILMOTT,
HENRY CORDELL.